United States Patent [19]

Long et al.

[11] 4,205,559

[45] Jun. 3, 1980

[54] NEOPRENE COATING COMPOSITION FOR REINFORCEMENT FABRICS FOR RUBBER PRODUCTS, PROCESS, AND PRODUCTS PRODUCED THEREBY

[75] Inventors: Delmar D. Long, Rock Hill; Gary A. Barnett, Lyman; Glenda M. High, Wellford, all of S.C.

[73] Assignee: M. Lowenstein Corporation, New York, N.Y.

[21] Appl. No.: 50,136

[22] Filed: Jun. 20, 1979

[51] Int. Cl.$^2$ .............................................. F16G 5/16
[52] U.S. Cl. ............................ 74/233; 260/29.7 H; 427/381; 427/389.9; 427/412; 428/260; 428/262
[58] Field of Search .............. 428/260, 262, 263, 264, 428/265, 907, ; 260/29.7 H; 427/381, 412, 392, 390 R; 74/232, 233

[56] References Cited

U.S. PATENT DOCUMENTS

| | | | |
|---|---|---|---|
| 4,062,989 | 12/1977 | Long | 427/176 |
| 4,116,159 | 9/1978 | Long | 118/34 |
| 4,116,743 | 9/1978 | Davis | 427/390 R |
| 4,141,875 | 2/1979 | Brizzolara | 260/29.7 H |

*Primary Examiner*—James J. Bell
*Attorney, Agent, or Firm*—Luke J. Wilburn, Jr.; Wellington M. Manning, Jr.

[57] ABSTRACT

An improved coating composition, coated reinforcement fabrics, reinforced rubber-based substrate products, and methods of manufacture thereof are disclosed. The coating composition comprises a carboxylated neoprene latex containing an aqueous dispersion of a copolymer of chloroprene and methacrylic acid, polyvinyl chloride as a colloidal stabilizer, and a high boiling oil derived largely from aromatic petroleum feedstocks through a distillation range of between about 195° C. through 325° C. The composition is highly stable, has a long shelf life, and is particularly suited for precoating textile reinforcement fabrics to provide a highly tacky uncured coating surface thereon having exceptionally long high tack in uncured, or green, state. The fabric is employed as a reinforcement layer or cover in rubber-based industrial products, such as power transmission belts, and may be applied in intimate physical adhesion therewith for subsequent vulcanization bonding thereto, as in a vulcanizing mold. The industrial products produced thereby exhibit long wear life with good cured adhesion between the reinforcement fabric and rubber substrate or core. The aromatic oil employed as a tackifier for the composition is present in an amount of between about 5 to 60 weight percent, based on the weight of the solids in the carboxylated neoprene component, and preferably between about 20–40 percent by weight. The composition contains a non-metallic oxide cross-linking agent for the vulcanizing cure reaction.

20 Claims, No Drawings

NEOPRENE COATING COMPOSITION FOR REINFORCEMENT FABRICS FOR RUBBER PRODUCTS, PROCESS, AND PRODUCTS PRODUCED THEREBY

The present invention relates to certain improvements in the bonding of textile fabrics to rubber products for reinforcement thereof, and, more particularly, to an improved adhesive-coated textile reinforcement fabric and coating composition therefor. The invention further includes the method of making the coated reinforcement fabric and rubber-based industrial products produced thereby.

BACKGROUND OF THE INVENTION

Textile fabrics are widely employed as reinforcement in various industrial products, such as hoses, conveyor belts, tires, power transmission belts and the like. In the production of such products, it is a practice to combine the reinforcement fabric with the uncured rubber carcass, substrate, or core of the final product during a vulcanizing operation such that heat curing bonds and adhesively secures the reinforcement fabric in intimate association with the rubber base of the product. To improve the cured adhesion and bonding of the reinforcement fabric to the rubber substrate, it is a practice to precoat the fabric with an adhesion-promoting composition, such as an uncured neoprene solvent or latex system.

In precoated reinforcement fabrics employed in power transmission belts, the coated reinforcement fabric may be employed as an intermediate reinforcement layer in the rubber core, as well as cut into a narrow strip which is folded about the longitudinal axis of the uncured rubber belt core, with side edges and end portions of the fabric strip disposed in overlapping relationship to form an outer protective covering for the core. In such cases, difficulties have been encountered in maintaining positive mechanical positional securement of the fabric to the rubber core, and especially the overlapped portions of the cover fabric to each other in preparing the belt for vulcanization cure in a mold. If intimate mechanical securement of the reinforcement fabric to the rubber carcass and to itself at the positions of fabric overlap is not obtained and maintained, the effective life of the belt can be greatly reduced by early separation of the fabric from the rubber core due to poor vulcanization bonding thereto.

It is therefore desirable to provide in these and like instances of uses of reinforcement fabrics a coated fabric which, at the time of vulcanization, has a highly tacky, or sticky, uncured rubber-coated surface to maintain intimate, positive mechanical adhesion of the fabric to the rubber core and to the overlapped fabric portions of the belt in preparation for and during the curing operation. Such uncured, surface stickiness in the coated reinforcement fabric is referred to herein as "open green tack". If such reinforcement fabrics are manufactured and precoated by a fabric manufacturer for later shipment, in roll goods form, to a belt manufacturer for incorporation into the final product, the coated reinforcement fabric may be coated weeks or even months before it is finally combined with the uncured rubber substrate in a final curing operation. Thus, it is essential that the coated fabric possess a long "open green tack" shelf life, in order that the reinforcement fabric does not lose its surface stickiness before it can be incorporated into the final product.

In rubber-based adhesive systems, it has heretofore been proposed to employ various organic components to impart tackiness or stickiness to the adhesive. Such components are generally referred to in the art as tackifiers. Although tackifiers perform the function of softening and improving the stickiness of a neoprene composition coating, they relatively quickly lose their uncured stickiness, or tack, after being coated on the fabric. Also, tackifiers inherently, because of their plasticizing nature, tend to reduce the amount of adhesion which can be obtained between the coated reinforcement fabric and the rubber substrate in final cured state. Thus, it has been difficult for a textile manufacturer to produce a precoated reinforcement fabric which has sufficient long open green tack shelf life to provide a belt manufacturer with time flexibility in use of the fabric in belt manufacture with the necessary cured adhesion in the final vulcanized product.

In addition to the above mentioned difficulties in developing uncured adhesion coatings and compositions exhibiting long open green tack shelf life without detrimentally affecting necessary adhesion values in cured state, many of the known tackifiers are incompatible for incorporation into various neoprene systems. Often the tackifiers cannot be uniformly dispersed in the adhesive composition, or, if dispersible therein, do not remain uniformly dispersed therein for any extended period of time. Thus, when such compositions are to be used for coating reinforcement fabrics on a large scale commercial, continuous coating operation where the coating composition must be available in large amounts and in uniformly dispersed condition for extended periods of time, many if not most of the possible compositions are unacceptable.

OBJECTS OF THE INVENTION

It is therefore an object of the present invention to provide an improved, highly stable neoprene latex composition having long "pot" life in commercial coating operations, and exceptionally high tackiness in green, or uncured, state when coated on reinforcement fabrics for rubber substrate products.

It is another object of the invention to provide an improved neoprene-coated reinforcement fabric having exceptionally long shelf life in open green tack state.

It is a further object to provide an improved coating composition and process for coating textile reinforcement fabrics to provide accepted adhesion of such fabrics to rubber substrate products for greatly extended periods of time after preparation of the coated fabric.

It is a more specific object to provide an improved neoprene coated reinforcement fabric having improved open green tack shelf life and accepted adhesion to rubber transmission belt products when employed as an outer protective covering therefor.

It is still another object to provide an improved fabric-reinforced rubber product for use in commercial application such as power belts, hoses, and conveyor belts.

DESCRIPTION OF THE INVENTION

Broadly stated, we have discovered that the particular combination of a carboxylated neoprene latex and a tackifier comprising a high boiling oil derived largely from aromatic petroleum feed stocks present in the combination in a range of from about 5 to 60 weight percent, based on the weight neoprene latex solids, and in the absence of a metallic oxide cross-linking agent for the system, provides a highly stable adhesive coating composition for reinforcement fabrics which exhibits exceptionally long shelf life in open green tack form on the fabric with good adhesion of the fabric to a rubber substrate when secured thereto in a subsequent heat curing operation. With the compositions of the present invention, uncured coated fabrics have exhibited high green tack for periods in excess of 6 months, and can thereafter be combined with a rubber substrate in a vulcanizing operation with excellent cured adhesion to the substrate.

In the present invention, exceptional results in long green tack and adhesion of the reinforcement fabrics have been obtained by use of carboxylated neoprene latices sold under the trade designation Neoprene Latex 101 and 102 by E. I. DuPont. Such carboxylated neoprene latices and their use as adhesive compositions are disclosed in prior U.S. Pat. Nos. 4,116,743 and 4,141,875, and the disclosures thereof are incorporated herein by reference for more specific detail of the formulations thereof. These carboxylated neoprene latices comprise an aqueous dispersion of a copolymer of chloroprene as a primary monomer and methacrylic acid as its comonomer, together with polyvinyl alcohol as a colloidal stabilizer for the system.

The particular high boiling aromatic oil employed as tackifier in the present invention is derived from aromatic petroleum feed stocks through a distillation range of between 195° C. through approximately 325° C., i.e., the aromatic oil derivative has an initial boiling point of 195° C. and 90% of the oil has been recovered when the distillation temperature reaches 325° C. One such high boiling oil is manufactured by Hercules, Inc., under the trademark Piccocizer ® 30M.

Although the aromatic high boiling oil which serves as a tackifier for the present system has heretofore been proposed as a tackifying agent for rubber-based adhesives, we have found that the aromatic oil is not generally compatible to stable mixture and compounding with neoprene-based aqueous latex systems, and attempts to formulate an homogenous stable composition which can be properly stored and/or coated on a fabric substrate have generally resulted in unstable coating compositions with no commercial value as an adhesive pre-coat for reinforcement fabrics. Surprisingly, however, we have found that the particular combination of a carboxylated neoprene latex and the aromatic oil tackifier within the certain ranges of amounts referred to above provides synergistic results in producing coated fabrics having exceptionally long high green tack shelf life and acceptable final adhesion in the cured rubber-based product. Such a result is believed quite unexpected, since use of a carboxylated neoprene latex with other tackifiers, as well as the use of the particular tackifier of the present invention with other neoprene latex systems, does not provide the improved long green tack shelf life and superior results obtained by the present invention. As mentioned above, we have found that when from about 5 to 60 weight percent of the tackifier, based on the solids weight of the carboxylated neoprene latex is combined and applied to a reinforcement fabric in a maner as hereinafter described, synergistic results are obtained in long green tack shelf life and proper fabric adhesion to the rubber substrate.

In addition to the carboxylated neoprene latex and the high boiling oil tackifier, the coating composition of the present invention may typically contain certain additional components employed in neoprene adhesive systems, such as non-metallic oxide cross-linking agents for the neoprene, antioxidants, catalysts, thickeners or the like. The synergistic effect of the particular combination of carboxylated neoprene and aromatic oil tackifier of the present invention with respect to long uncured green tack and cured adhesion is illustrated by the following examples showing the improved results obtained therewith, as compared to use of the carboxylated neoprene latex with another tackifier and the use of the tackifier of the present invention with another known neoprene latex system.

In preparing the coating formulations in Table 1, the components were added to the formulation during stirring in the sequence in which they are listed therein, and the composition was stirred for an additional 30 minutes after all of the ingredients were combined. Amounts are stated in parts by weight of the composition.

TABLE I

| Component | Formula | | | | | | | | | | |
|---|---|---|---|---|---|---|---|---|---|---|---|
| | 1 | 2 | 3 | 4 | 5 | 6 | 7 | 8 | 9 | 10 | 11 |
| Neoprene Latex Copolymer of cloroprene and methacrylic acid; 46% solids (Latex 102-duPont) | 218 | 218 | 218 | — | — | — | — | — | — | 218 | 218 |
| Neoprene latex polymer of choroprene and sulfur; 50% solids (Latex 572-duPont) | — | — | — | 200 | 200 | 200 | — | — | — | — | — |
| Neoprene latex copolymer of choroprene and 2,3-dichloro-1,2-butadiene, 50% solids (Latex 750-duPont) | — | — | — | — | — | — | 200 | 200 | 200 | — | — |
| Melamine formaldehyde resin cross-linker, 98% reactive (Cymel 301-Amer. Cyanamid) | 4 | 4 | 4 | 4 | — | — | 4 | — | — | 4 | 4 |
| Sulfur, 70% solids | 1 | 1 | 1 | 1 | 5 | 1 | 1 | 5 | 1 | 1 | 1 |
| Antioxidant of Para-phenylene diamine, 50% solids (Paranol 9271-Parachem) | 4 | 4 | 4 | 4 | 4 | — | 4 | 4 | — | 4 | 4 |
| Antioxidant and cross | | | | | | | | | | | |

TABLE I-continued

| Component | Formula | | | | | | | | | | |
|---|---|---|---|---|---|---|---|---|---|---|---|
| | 1 | 2 | 3 | 4 | 5 | 6 | 7 | 8 | 9 | 10 | 11 |
| linker of ZnO and paraphenylene diamine, 7 to 2 ratio (Paranol 9128-Parachem) | — | — | — | — | — | 7 | — | — | 7 | — | — |
| Ammonium acetate (10% solids) | 15 | 15 | 15 | — | — | — | — | — | — | 15 | 15 |
| Tackifier of high boiling aromatic oil derived from feed stocks (Piccocizer 30M-Hercules) | 20 | 5 | 60 | 20 | — | — | 20 | — | — | — | — |
| Tackifier of low mol. wgt. thermoplastic copolymer resin; 55% solids (Picconol 400-Hercules) | — | — | — | — | 60 | 60 | — | 60 | 60 | 60 | — |
| Tackifier of hydrogenated methyl ester resin (Hercolyn ® D-Hercules) | — | — | — | — | — | — | — | — | — | — | 20 |

Twenty-four hours after formulation each of the above formulations were coated in equal amounts on one surface of stretched, bias-cut woven 50/50 polyester cotton fabric samples. The coatings were applied by use of a Gardner knife, the coated fabrics dried for 1 minute at 240° F., and recoated and redried in similar manner.

Thereafter, to determine the relative degree of open green tack, or uncured stickiness, of the coated fabric samples, two 1 inch by 12 inch strips of each coated fabric sample were folded upon themselves in coated face-to-face relation and subjected to a pressure of 315 PSI for one minute. Each of the folded strips was then placed in an Instron machine and ends of the adhered portions were pulled apart in 180° directions at a pull rate of 12 inches per minute. The resultant force of pull, in pounds per inch, was observed on the Instron apparatus. The average of two fabric sample observations for each formulation was recorded. Subsequently, at intervals of 1, 2, 3, 7, 14 and 21 days after fabric sample coatings two fabric samples for each formulation were adhered in face-to-face relation, as above, and tested in similar manner in the Instron apparatus. The comparative results of the tests, stated in pounds per inch of pull, are set forth in the following table.

high green tack adhesion over an extended shelf life period of three weeks during which the tests were conducted. In distinction thereto, it can be observed that fabric samples containing coating compositions of non-carboxylated neoprene latex systems with the aromatic oil tackifier (formulas 4 and 7) and neoprene latex systems with other known tackifiers (formulas 5, 6 and 8–10) lost their effective green tack adhesion within the period of testing. It can further be observed that although fabric samples coated with formulation 10 did exhibit high green tack adhesion for an initial time period, the adhesion value dropped remarkably to an unacceptable level after 21 days after coating. It has been observed that, in the use of the coated reinforcement fabrics of the present invention for reinforcement of power transmission belts, an Instron test reading of from 4 to 5 lbs. is required for acceptable green tack performance in commercial operations.

To determine the adhesion values of the coated fabric samples of the above formulations to themselves under conditions of vulcanization, or heat cure, coated fabric samples of each of the above formulations, prepared as above, and on a time interval basis, were folded, in face-to-face relation to themselves, and subjected to a heat cure of 320° F. for twenty minutes at a pressure of

TABLE II

| Time Of Test | Formulas | | | | | | | | | | |
|---|---|---|---|---|---|---|---|---|---|---|---|
| | 1 | 2 | 3 | 4 | 5 | 6 | 7 | 8 | 9 | 10 | 11 |
| Initial Green Tack - Lbs. | 7–8.5 | 10–12 | 1.5–2 | 1–1.5 | 7–8.5 | 4.5–6 | 1–1.5 | 6–7.5 | 5–5.8 | 9–10.5 | — |
| 24 Hour Green Tack - Lbs. | 8–8.5 | 10.5–13 | 3–4 | .5–1.0 | 4–5.5 | 2–3 | 1–1.5 | 4–5.5 | 3–6.5 | 11–13.5 | — |
| 48 Hour Green Tack - Lbs. | 8–9.0 | 10–12.5 | 4.5–5 | <.5 | 3.5–4 | 1–3.5 | 1–1.5 | 4–5 | 2–4.5 | 11–15 | — |
| 72 Hour Green Tack - Lbs. | 7–9.5 | 9–10.5 | 4.5–6.5 | — | 1.5–3 | .5–1.5 | .5–1.5 | 3.5–4 | 2–4.5 | 10–12.5 | — |
| 168 Hour Green Tack - Lbs. | 7–8 | 7.5–10 | 6–7.5 | — | <.5 | <.5 | <.5 | 2–3.5 | .5–1 | 11–13 | — |
| 336 Hour Green Tack - Lbs. | 6.5–7.5 | 7–8.5 | 7–8.5 | — | — | — | — | <.5 | <.5 | 10–14.5 | — |
| 504 Hour Green Tack - Lbs. | 6.0–7 | 4–4.5 | 8–9.0 | — | — | — | — | — | — | 1.5–3.5 | — |

In observing the foregoing table, formulation 11 could not be blended sufficiently for coating. Fabric samples containing coating formulations 1, 2 and 3 of the present invention, which utilize the aromatic oil tackifier in amounts varying between 5 to 60 percent based on the solids weight of the carboxylated neoprene latex, exhibited generally uniform and exceptionally 135 PSI. Two fabric samples of each of the formulations were placed in an Instron apparatus and the ends of the fabric peeled at a 180° angle at a peel rate of 12 inches per minute. The average results of the cured adhesion tests, performed at varying intervals of time after initial coating of the fabrics, is set forth in the following table.

TABLE III

| Results | Formulas | | | | | | | | | | |
|---|---|---|---|---|---|---|---|---|---|---|---|
| | 1 | 2 | 3 | 4 | 5 | 6 | 7 | 8 | 9 | 10 | 11 |
| Cure Adhesion-Initial-Lbs. | 12.5–15 | 13–18.5 | 4.5–6 | 17–22 | 12–16 | 14–19 | 16–17.5 | 11.5–16 | 13–18 | 12–17 | — |
| Cured Adhesion-168 Hours-Lbs. | 14–17 | 20–26.5 | 11–14.5 | 24–28 | 19–23 | 23–27 | 17–17.5 | 17.5–18.5 | 15–17 | 14–19 | — |
| Cured Adhesion-336 Hours-Lbs. | 14–19 | 22–28 | 14.5–18.5 | 24–28 | 20–24 | 24–27 | 19–20.5 | 17.5–19 | 17–20 | 19–23 | — |
| Cured Adhesion-504 Hours-Lbs. | 16–19 | 24–31 | 16–18 | 24–28 | 20–24 | 23–26.5 | 19–21 | 18–20 | 18–21 | 20–29 | — |

From the foregoing values, it can be observed that all of the samples exhibited a cured adhesion within the range of approximately 14 to 25, above the acceptable range for commercial use as reinforcement fabrics in power transmission belts, i.e., approximately 9–10. Although the comparative formulations 4–10, which do not come within the scope of the present invention, exhibit higher cured adhesion values, their use is not acceptable for delayed cover fabric reinforcement of power belts because of their inability to be positively mechanically secured to the rubber core of a power belt for vulcanization, due to excessive loss of green tack after the time periods indicated, as evidenced in Table II.

Although it can be seen from the results of test data accumulated on formulations 1–3 that amounts of the aromatic oil tackifier between about 5 and 60 weight percent based on the percent solids in the neoprene latex provide the improved results in long term high green tack shelf life, it has been found that best results are obtained in long green tack when the tackifier is present in an amount of between about 20–40% based on the amount of solids in the carboxylated neoprene latex component.

In addition, it has been found that the compositions of the present invention cannot be formulated for acceptable coating of fabrics by the use of typical metallic oxide cross-linking agents, as would be expected, since the composition cannot be stabilized to uniformly coat the fabrics.

The following specific example illustrates a manner in which the adhesive coating compositions and coated reinforcement fabrics of the present invention may be employed in commercial operation to produce power transmission V-belts.

EXAMPLE

A coating composition containing the following ingredients, in parts by weight, were combined in the order listed in a blade agitated mixer and stirred for 30 minutes after all ingredients had been added.

| Component | Parts by Weight |
|---|---|
| Neoprene Latex 102-duPont (46% solids) | 218 |
| Cymel 301-American Cyanamid | 4 |
| Sulfur, 70% solids | 1 |
| Paranol 9271-Parachem | 4 |
| Ammonium Acetate | .075 |
| Carbon black, 22% solids (Product 20-72, Monochem) | 20 |
| Piccocizer 30M-Hercules | 40 |
| Self-emulsifying formaldehyde scavenger (Aldor-Alpine Aromatics Int.) | .002 |

The resultant coating composition exhibits excellent stability against any separation or layering for a period exceeding six months significant viscosity change. The foregoing composition, having a viscosity of approximately 600 CPS is applied to the under surface of a reinforcement fabric in a continuous coating operation in the following manner.

A 50—50 polyester cotton blend woven fabric having a warp and pick count of 35×35 per inch and a fabric weight of 7.75 oz. per square yard was bias cut to produce a continuous length of fabric having warp and fill yarns disposed at a 45° angle to the longitudinal length of the fabric. A continuous length of such bias-cut fabric was continuously overfed onto a tenter frame of a coating range where it was transversely stretched to produce a warp to fill yarn angle of approximately 110° relative to the longitudinal axis of the fabric. The stretched fabric was passed horizontally through a coating range where a first layer of the above coating composition was applied from a gravity fed coating hand across the width of the undersurface of the fabric to at least partially penetrate the interstices of the fabric. The fabric containing the first coating layer was passed through a forced-air drying oven where it was heated at a temperature of 240° F. for approximately 45 seconds to dry the coating, while allowing upward evaporation of liquids through the fabric to facilitate penetration of the coating into the interstices of the same.

Thereafter, a second coating layer of the above composition was applied onto the first layer by means of a second coating head while simultaneously applying a first, nontackified neoprene-based latex composition to the upper surface of the fabric from an opposed coating head. The thus coated fabric was then passed through a second drying oven where it was heated at a temperature of 240° F. for a period of 45 seconds to dry the same to an uncured, tackified state. The coated and dried fabric contained approximately 65 percent by weight coating, based on the greige fabric weight, with the first and second tackified under-coating layers being applied as 50 percent and 20 percent of the total coating weight, respectively.

The coated fabric was collected in roll form utilizing a polyethylene separator sheet to prevent adhesion of the highly tacky undersurface of the fabric to adjacent layers in the coated fabric roll. The fabric was thereafter stored for a period of approximately 90 days.

The apparatus employed for carrying out the fabric coating process of the present invention may be of the general type disclosed in commonly assigned U.S. Pat. Nos. 4,062,989 and 4,116,159 which are particularly suited for one pass and two pass coating respectively, of continuously moving, bias-cut textile fabrics maintained under tension during coating on a tenter frame conveyor.

The coated fabric was thereafter cut into longitudinal narrow strips for combination with the uncured rubber cores of V-belt constructions.

Individual cut strips of the coated fabric are folded longitudinally about the rubber core belts, with the tackified surface of the fabric placed in intimate contact with the surface of the rubber cores, and with end and longitudinal side edge portions of the fabric overlapping to completely cover the core. The fabric strip coverings exhibit excellent mechanical adhesion to the core and to the overlapped portions of the strips thereon.

A plurality of such fabric-covered cores are then placed in a conventional vulcanizing ring mold having mold cavities conforming to the shape of the belts. The multiple ring mold is encased in a precured rubber sleeve and autoclaved at 320° F. for 20 minutes under a pressure of between about 75–135 PSI. Because of the highly tacky nature of the coated surface of the strips in contact with the rubber core, they are held securely affixed thereto in preparation for and during insertion into the multiple ring mold apparatus, thereby ensuring good adhesive bonding of the reinforcement fabrics to the rubber core of the product.

The resultant power transmission belts, when tested on an Instron tester, exhibit 20–30 lbs. per inch adhesion strength between fabric and rubber core, based on a 12 inch per minute peel rate.

That which is claimed is:

1. An adhesive composition for coating textile reinforcement fabrics to provide improved long open green tack shelf life of the coated fabrics in uncured form and to provide good adhesion of the fabrics to a rubber substrate in subsequent vulcanization therewith, comprising, in combination:
   (a) a carboxylated neoprene latex;
   (b) from about 5 to 60 percent by weight, based on the weight of solids in the neoprene, of a high boiling aromatic oil derived from aromatic petroleum feed stocks by distillation through a range of from about 195° C. through 325° C; and
   (c) a non-metallic oxide cross-linking agent for the carboxylated neoprene.

2. A composition as defined in claim 1 wherein said carboxylated neoprene latex comprises an aqueous dispersion of a copolymer of chloroprene as a primary monomer and methacrylic acid as a comonomer, and polyvinyl alcohol as a colloid stabilizer.

3. A composition as defined in claim 1 wherein said high boiling aromatic oil has an initial boiling point of about 195° C., and is recovered from said aromatic petroleum feed stocks through a distillation range of from 195° C. through 325° C., at which point approximately 90% of the oil has been obtained.

4. A composition as defined in claim 3 wherein said oil is present in said coating composition in amount of about 20 to 40 percent weight, based on the weight of solids in the neoprene latex.

5. A composition as defined in claim 1 wherein said cross-linking agent comprises sulfur and a melamine-formaldehyde resin.

6. A composition as defined in claim 5 including a catalyst for cross-linking said composition under vulcanizing conditions comprising ammonium acetate.

7. A composition as defined in claim 1 including an antioxidant comprising paraphenylene diamine.

8. A method of producing a textile reinforcement fabric for rubber substrate-containing products having increased shelf life in uncured, high green tack state and good adhesion of the fabric to the rubber substrate during a vulcanizing operation, comprising the steps of:
   (a) coating at least one surface of a textile reinforcement fabric with a coating composition comprising a carboxylated neoprene latex, and from about 5 to 60 percent by weight, based on the weight of solids in the neoprene, a high boiling aromatic oil derived from aromatic petroleum feed stocks through a distillation range of between about 195° through 325° C; and
   (b) drying the coating on the fabric surface to a tackified, uncured state.

9. A method as defined in claim 8 wherein the coating composition is applied to the surface of the fabric by:
   (a) directing an indefinite length of bias-cut textile fabric under tensioned conditions along a generally horizontal path of travel;
   (b) applying a first layer of said coating composition onto the undersurface of the fabric to at least partially penetrate the interstices thereof;
   (c) drying said first layer on the fabric while permitting vaporization of liquids therefrom in an upward direction through the fabric to facilitate penetration of the interstices of the fabric with the coating layer;
   (d) applying a second layer of said composition onto said first layer on the undersurface of the fabric;
   (e) drying said second layer of said coating on the fabric to uncured state; and
   (f) continuously collecting the coated fabric in roll form.

10. A method as defined in claim 8 wherein said carboxylated neoprene latex comprises an aqueous dispersion of a copolymer of chloroprene as a primary monomer and methacrylic acid as a comonomer therewith, and polyvinyl alcohol as a colloidal stabilizer therefor.

11. A method as defined in claim 10 wherein said aromatic oil is present in said coating composition in from about 20 to 40 percent by weight, based on the weight of the neoprene solids.

12. A coated textile reinforcement fabric for rubber substrate-containing products having improved long green tack shelf life in uncured form and good adhesion to a rubber substrate in a subsequent heat curing operation therewith, comprising a textile fabric construction having at least one surface thereof coated with a dry, uncured coating composition comprising a carboxylated neoprene resin and a high boiling aromatic oil derived largely from aromatic petroleum feed stocks over a distillation range of from about 195° through about 325° C.

13. A reinforcement fabric as defined in claim 12 wherein said coating composition extends at least partially into the interstices of the textile fabric.

14. A coated textile fabric as defined in claim 12 wherein said aromatic oil is present in said coating in an amount from between about 5 to 60 percent by weight, based on the dry weight of the carboxylated neoprene composition.

15. A coated textile fabric as defined in claim 12 wherein said carboxylated neoprene latex comprises a copolymer of chloroprene as a primary monomer and methacrylic acid as a comonomer therewith, and polyvinyl alcohol as a colloidal stabilizer.

16. A method of manufacturing a power belt having a reinforced fabric covering adhesively secured to a rubber core of the belt comprising the steps of:
   (a) coating at least one surface of a textile fabric with a coating composition comprising a carboxylated neoprene latex and a high boiling oil derived largely from aromatic petroleum feed stocks as a tackifier for said neoprene;
   (b) drying the coated fabric to an uncured highly tackified state;
   (c) subsequently wrapping the coated fabric about an uncured rubber core of a power belt with the coated surface of the fabric in intimate adhesive contact with the core, and with edge portions of the coated fabric overlapping and adhesively secured to each other to cover the belt; and (d) thereafter subjecting the fabric covered core to a vulcanizing operation to heat the rubber substrate and coated fabric and adhesively bond the same to each other.

17. A power transmission belt having a central rubber core, and a reinforced fabric covering thereabout, said fabric covering having a coating on the surface thereof in engagement with the rubber core comprising a carboxylated neoprene resin and from about 5 to 60 percent, based on the weight of the neoprene resin, of a high boiling aromatic oil derived from aromatic petroleum feedstocks by distillation through a range of from about 195° through 325° C.

18. A product as defined in claim 17 wherein said carboxylated neoprene resin comprises a copolymer of polychloroprene and methacrylic acid.

19. A product as defined in claim 18 wherein said high boiling aromatic oil is present in an amount of between about 20–40 percent by weight based on the weight of the carboxylated neoprene resin.

20. A coated textile fabric as defined in claim 12 wherein said carboxylated neoprene resin comprises a copolymer of chloroprene and methacrylic acid, and wherein said high boiling aromatic oil is present in an amount of between about 5 to 60 weight percent, based on the weight of the neoprene solids.

* * * * *

UNITED STATES PATENT AND TRADEMARK OFFICE
CERTIFICATE OF CORRECTION

PATENT NO. : 4,205,559
DATED : June 3, 1980
INVENTOR(S) : Delmar D. Long, Gary A. Barnett, Glenda M. High It is certified that error appears in the above-identified patent and that said Letters Patent are hereby corrected as shown below:

Column 4, line 20, "maner" should read --manner--.

Column 6, line 47, "to", second occurrence, should read --on--.

Column 8, line 24, "hand" should read --head--.

Signed and Sealed this

Fifth Day of August 1980

[SEAL]

Attest:

SIDNEY A. DIAMOND

Attesting Officer

Commissioner of Patents and Trademarks